United States Patent [19]

Krings

[11] 4,274,763
[45] Jun. 23, 1981

[54] EXCAVATING SHEETING UNIT

[76] Inventor: Josef Krings, Hans-Boeckler-Str. 23, D-5138 Heinsberg-Oberbruch, Fed. Rep. of Germany

[21] Appl. No.: 30,463

[22] Filed: Apr. 16, 1979

[30] Foreign Application Priority Data

Apr. 18, 1978 [DE] Fed. Rep. of Germany ....... 2816709

[51] Int. Cl.³ ............................................. E21D 5/00
[52] U.S. Cl. ..................................... 405/282; 405/272
[58] Field of Search ............... 405/282, 283, 281, 284, 405/285, 272

[56] References Cited

U.S. PATENT DOCUMENTS

| 3,212,270 | 10/1965 | Benintend | 405/272 |
| 3,910,053 | 10/1975 | Krings | 405/282 |
| 3,910,054 | 10/1975 | Krings | 405/282 |
| 3,937,026 | 2/1976 | Krings | 405/282 |
| 3,967,454 | 7/1976 | Barnes | 405/282 |
| 4,054,033 | 10/1977 | Pillosio | 405/282 |

Primary Examiner—Dennis L. Taylor
Attorney, Agent, or Firm—Diller, Ramik & Wight

[57] ABSTRACT

This disclosure relates to an excavating sheeting unit having an outside adapted to bear against a trench surface and including a pair of spaced generally vertically disposed guide rails of C-shaped transverse cross section opening toward each other, a pair of sheeting plates having lateral edges disposed within the confines of the C-shaped guide rails, rollers carried by the lateral edges of the sheeting plates to permit relative sliding motion of the latter relative to each other and relative to the guide rails, and a plurality of supporting members located inside of the sheeting unit rigidly connecting together the guide rails and defining therewith a guide frame.

16 Claims, 5 Drawing Figures

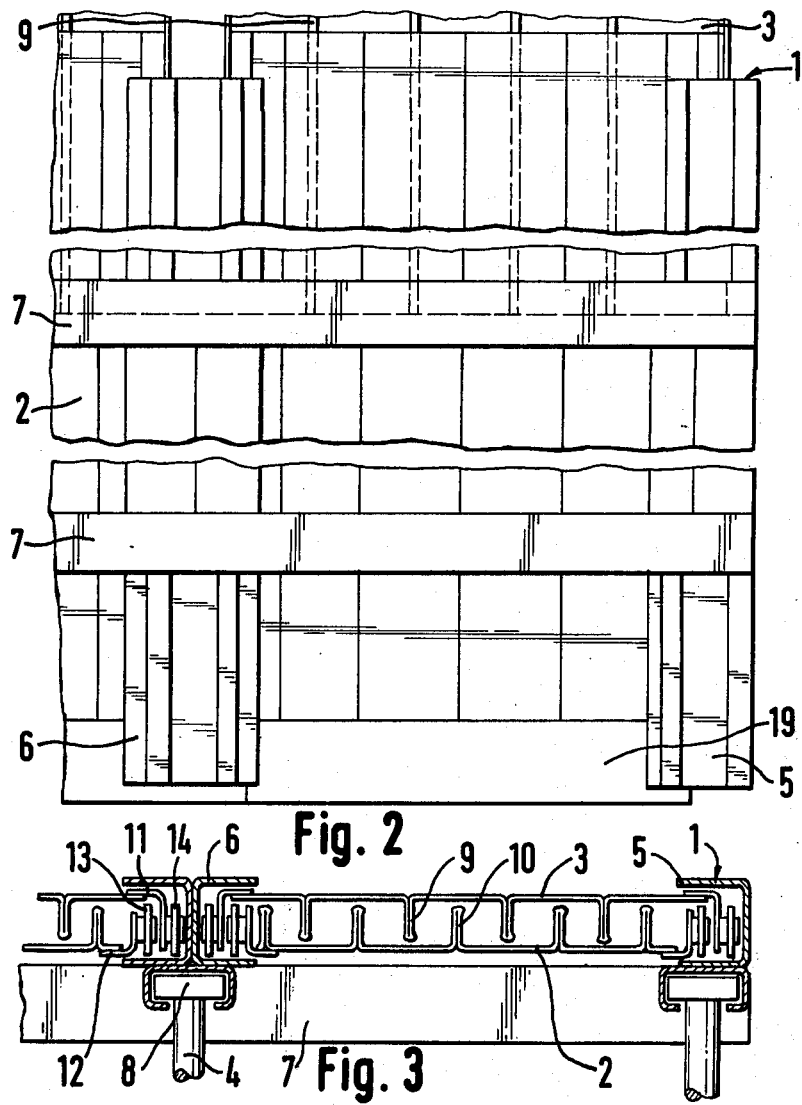

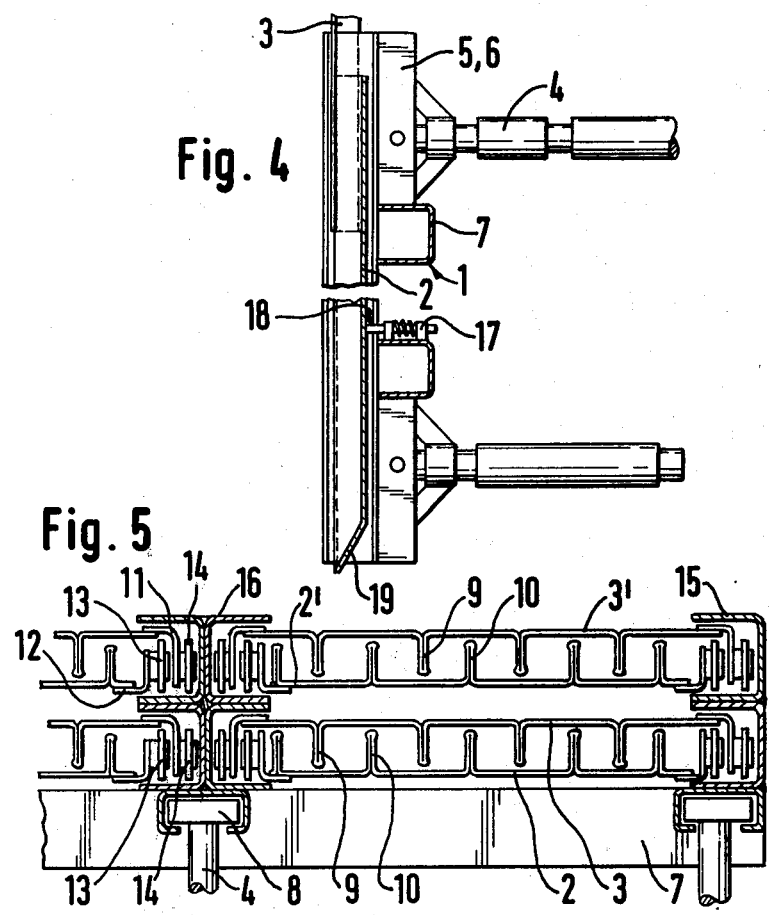

EXCAVATING SHEETING UNIT

The present invention is directed to a sheeting unit which is particularly adapted to be introduced into an excavation, such as a trench, ditch, or the like, and includes a pair of vertical guide rails between which are slidably received one or more sheeting plates.

The excavation sheeting unit of this invention is specifically designed for excavations which require imminent shoring or support as they are dug, among which are sandy sites, quicksand, or the like, or in excavations which require only transient or temporary shoring for various other reasons of construction, apart from the condition of the soil at the excavation area. Such excavation sheeting units, therefore, must be relatively compact in size, immediately operationable, and must be immediately capable of being enlarged or expanded as the excavation operation continues.

In keeping with the present invention, the excavating sheeting unit has an outside adapted to bear against a trench or like excavation surface and includes a pair of relatively slidable sheeting plates having lateral edges received in C-shaped guide rails with the latter being rigidly inner-connected by supporting members which define therewith a rigid frame. By means of this construction, sheeting plates are permitted to be relatively movable relative to the guide rails in a vertical direction and with the supporting members being located at the inside of the sheeting unit, the entire exterior or outside of the sheeting unit, including the outside surfaces of the guide rails and the sheeting plates, can bear against the surface being excavated and yet be moved relative thereto and to each other, contrary to known designs (U.S. Pat. No. 3,212,270). Thus, in the case of the present invention, the guide frame can be lowered to an arbitrary depth into a trench and as the depth of the latter is increased through the excavation operation, one or more of the sheeting plates can be lowered as the excavation is deepened, thus, providing initial support of the excavation walls during the initial excavation and continuing to do so until the total depth of the excavation has been achieved.

In cases where the invention is applicable to relatively deep excavations, the C-shaped guide rails can be used in tandem pairs or by the use of equivalent E-shaped guide rails, two pairs of sheeting plates can be selectively guided vertically downwardly during continued excavation, thus, in effect doubling the totality of the depth which can be shored in comparison to the first described embodiment of the invention which the guide rails are of a C-shaped construction.

In further accordance with this invention, the sheeting plates are preferably disposed in spaced parallel pairs with each sheeting plate having vertical ribs, and the ribs being disposed in meshed relationship with each other to impart rigidity to the sheeting plates and the overall sheeting unit.

With the above and other objects in view that will hereinafter appear, the nature of the invention will be more clearly understood by reference to the following detailed description, the appended claims and the several views illustrated in the accompanying drawings.

IN THE DRAWINGS

FIG. 2 is a fragmentary rear elevational view of the excavating sheeting unit of FIG. 1, and illustrates a lower most edge of an innermost of the sheeting plates raised slightly above that shown in FIG. 1 preparatory to initially inserting the excavating sheeting unit into an initially begun excavation.

FIG. 3 is a fragmentary top plan view partially in cross section looking downwardly in FIG. 2, and illustrates lateral edges of a pair of sheeting plates carrying rollers guided for sliding movement within the guide rails which are of a generally C-shaped transverse cross section.

FIG. 4 is a side elevational view partially in cross section of the excavation sheeting unit, and illustrates a locking mechanism for locking an innermost one of the sheeting plates at any one of a plurality of selected positions.

FIG. 5 is a fragmentary top plan view similar to FIG. 3 of another excavating sheeting unit of this invention, and illustrates another pair of associated C-shaped guide rails in associated sheeting plates.

Figure 1:
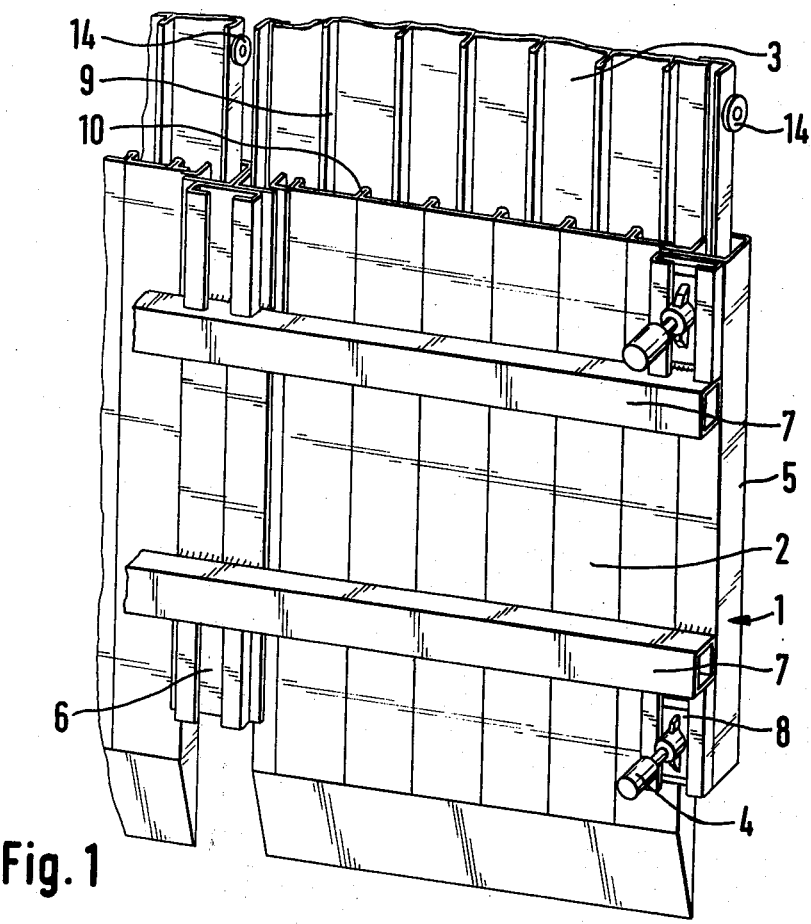
FIG. 1 is a fragmentary perspective view of a novel excavation sheeting unit of this invention and illustrates a pair of sheeting plates having vertical ribs and lateral edges in sliding relationship to laterally spaced guide rails defining with supporting members secured to their inner surfaces a rigid guide frame.

A novel excavating unit constructed in accordance with this invention is fully illustrated in FIGS. 1 through 4 of the drawings and includes a rigid guide frame 1 which is in part defined by a generally vertically disposed guide rails 5, 6 of a generally C-shaped transverse cross section (FIG. 3) rigidly interconnected by horizontally disposed supporting members or wales 7 welded or otherwise fastened to the guide rails 5, 6 at inside surfaces or faces (unnumbered) thereof. The C-shaped guide rails 5, 6 are in opposed relationship to each other (FIG. 3) and slidingly received therein are sheeting plates 2, 3 whose lateral edges (unnumbered) are confined within the guide rails 5, 6.

At the lateral sides of the sheeting unit, the guide rails, such as the guide rail 5 of FIG. 3, is simply C-shaped in cross section but if the sheeting unit is of an appreciable length, the next innermost guide rail 6 is secured to an oppositely opening C-shaped guide rail which may, of course, be substituted by a single, integral, one-piece H-shaped guide rail. However, irrespective of the particular transverse cross-sectional configuration of the guide rails (C-shaped, E-shaped, H-shaped, U-shaped, or the like), the function thereof is to form a rigid frame in conjunction with the horizontal supporting members 7 and to guide within the confines thereof the lateral edges (unnumbered) of the sheeting plates 2, 3.

The sheeting unit is, of course, placed into an excavation and directly opposite thereto in the same excavation might be an identically constructed sheeting unit with the two sheeting units being innerconnected by adjustable supporting struts 4 carrying gliding shoes or heads 8 recieved in generally C-shaped or U-shaped rails (unnumbered) welded or otherwise secured to the guide rails 5, 6 in the manner best illustrated in FIGS. 1 and 3.

Reference is now made specifically to FIG. 3 of the drawings which illustrates each of the sheeting plates 2, 3 having respective folded ribs 10, 9 directed toward each other and in meshed relationship to each other for reinforcing the sheeting plates 2, 3 in the overall guide frame. Preferably, the sheeting plates 2, 3 are formed of metal and the ribs 10, 9, respectively, are simply flattened overfolds of the metal of the respective sheets.

At the lateral edges (unnumbered) of the sheets 2, 3 are respective angle irons 12, 11, which carry respective rollers 13, 14. The angle irons 11, 12 and the rollers 13, 14 are disposed within the confines of the associated guide rails 5, 6 and the totality of the sheeting plate 2 is confined within the angle irons 11 of the sheeting plate 3.

The sheeting plate 2 is the innermost of the two sheeting plates 2, 3, and at its lowermost edge it is beveled toward the outside as is indicated by the reference numeral 19 in FIG. 2. The beveled edge or surface 19 functions not only to facilitate the introduction of the excavating sheeting unit into an excavation in a known manner, but also provides a lower rest for the outermost sheeting plate 3, as can be most readily visualized from FIG. 4.

In order to selectively position the inside sheeting plate 2 at any one of a plurality of arbitrary heights relative to the guide frame and particularly the guide rails 5, 6, a spring-loaded locking means 17 (FIG. 4) is provided for engaging beneath one of a plurality of vertically spaced stops 18 welded or carried in any suitable fashion by the sheeting plate 2.

Insofar as the embodiment of the invention is concerned which is shown in FIG. 5, in this case the first embodiment is essentially duplicated by providing additional guide rails 15, 16 and similar sheeting plates 2', 3' operative in the manner heretofore described.

The excavating sheeting units of FIGS. 1 through 4 or 5 are placed in an excavation, such as a trench segment, by means of a crane or the like are are braced against the trench walls or surfaces in a conventional manner, as by the struts 4. Thereafter, the inside sheeting plate 2 is lowered after the trench has been further excavated and after the sheeting plate 2 has reached the bottom of the further excavated trench, the total guide frame including the supporting members 7 and the guide rails 5, 6 can be further lowered, should such be necessary. Obviously, in keeping with the embodiment of the invention shown in FIG. 5, the sheeting plates 2', 3' can also be lowered as might be necessary and if necessary, another guide frame with associated sheeting plates can be placed atop the first positioned excavating sheeting unit, etc.

Preferably, the excavation sheeting units of the type heretofore described are approximately five meters long and may be utilized in trench depths of between three to eight meters.

Although only a preferred embodiment of the invention has been specifically illustrated and described herein, it is to be understood that minor variations may be made in the apparatus without departing from the spirit and scope of the invention, as defined in the appended claims.

I claim:

1. An excavation sheeting unit having an outside adapted to bear against a trench surface or the like comprising a pair of spaced generally vertically disposed parallel guide rails, means for rigidly connected together said guide rails, a pair of relatively large sheeting plates each having opposite upstanding lateral edges, said lateral edges defining means for vertical sliding guiding motion relative to associated ones of said guide rails whereby said sheeting plates move in relative parallel sliding motion with respect to each other, at least one supporting strut associated with each guide rail and being disposed generally transverse thereto, means for slideably mounting each supporting strut relative to its associated guide rail for movement generally parallel to the relative sliding motion of said sheeting plates, and means for locking at least one of said sheeting plates in any of several predetermined positions of adjustment relative to the other of said sheeting plates.

2. The excavation sheeting unit as defined in claim 1 wherein each sheeting plate is of a comb-like horizontal cross-sectional configuration defined by a major wall portion and a plurality of generally parallel vertical ribs projecting laterally therefrom.

3. The excavation sheeting unit as defined in claim 1 wherein each sheeting plate is of a comb-like horizontal cross-sectional configuration defined by a major wall portion and a plurality of generally parallel vertical ribs projecting laterally therefrom, and said ribs being in generally meshed relationship to each other.

4. The excavation sheeting unit as defined in claim 1 wherein adjacent lateral edges of said sheeting plates project in opposite directions generally parallel to each other and normal to the direction of relative parallel sliding motion of said sheeting plates.

5. The excavation sheeting unit as defined in claim 1 wherein each sheeting plate is of a comb-like horizontal cross-sectional configuration defined by a major wall portion and a plurality of generally parallel vertical folded ribs projecting laterally therefrom.

6. The excavation sheeting unit as defined in claim 1 wherein each lateral edge carries guide roller means for engaging a flange of its associated guiding rail.

7. The excavation sheeting unit as defined in claim 1 wherein a lower edge of one of said sheeting plates is inclined downwardly and outwardly.

8. The excavation sheeting unit as defined in claim 1 wherein each sheeting plate is of a comb-like horizontal cross-sectional configuration defined by a major wall portion and a plurality of generally parallel vertical ribs projecting laterally therefrom, and said ribs being in generally meshed relationship to each other.

9. The excavation sheeting unit as defined in claim 1 wherein each sheeting plate is of a comb-like horizontal cross-sectional configuration defined by a major wall portion and a plurality of generally parallel vertical ribs projecting laterally therefrom, and adjacent lateral edges of said sheeting plates project in opposite directions generally parallel to each other and normal to the direction of relative parallel sliding motion of said sheeting plates.

10. The excavation sheeting unit as defined in claim 1 wherein each sheeting plate is of a comb-like horizontal cross-sectional configuration defined by a major wall portion and a plurality of generally parallel vertical folded ribs projecting laterally therefrom.

11. The excavation sheeting unit as defined in claim 1 wherein each sheeting plate is of a comb-like horizontal cross-sectional configuration defined by a major wall portion and a plurality of generally parallel vertical ribs projecting laterally therefrom, and each lateral edge carries guide roller means for engaging a flange of its associated guiding rail.

12. The excavation sheeting unit as defined in claim 1 wherein each sheeting plate is of a comb-like horizontal cross-sectional configuration defined by a major wall portion and a plurality of generally parallel vertical ribs projecting laterally therefrom, and a lower edge of one of said sheeting plates is inclined downwardly and outwardly.

13. The excavation sheeting unit as defined in claim 8 wherein adjacent lateral edges of said sheeting plates project in opposite directions generally parallel to each other and normal to the direction of relative parallel sliding motion of said sheeting plates.

14. The excavation sheeting unit as defined in claim 9 wherein each sheeting plate is of a comb-like horizontal cross-sectional configuration defined by a major wall portion and a plurality of generally parallel vertical folded ribs projecting laterally therefrom.

15. The excavation sheeting unit as defined in claim 14 wherein each lateral edge carries guide roller means for engaging a flange of its associated guiding rail.

16. The excavation sheeting unit as defined in claim 14 wherein a lower edge of one of said sheeting plates is inclined downwardly and outwardly.

* * * * *